(12) United States Patent  (10) Patent No.: US 7,245,514 B2
Shao et al.  (45) Date of Patent: Jul. 17, 2007

(54) SYNCHRONOUS RECTIFICATION CIRCUIT

(75) Inventors: Geliang Shao, Saitama (JP); Hiroaki Takada, Saitama (JP)

(73) Assignee: Tamura Corporation, Tokyo (JP)

( * ) Notice: Subject to any disclaimer, the term of this patent is extended or adjusted under 35 U.S.C. 154(b) by 0 days.

(21) Appl. No.: 11/475,969

(22) Filed: Jun. 28, 2006

(65) Prior Publication Data

US 2007/0014133 A1 Jan. 18, 2007

(30) Foreign Application Priority Data

Jun. 28, 2005 (JP) .............................. 2005-188312

(51) Int. Cl.
*H02M 7/217* (2006.01)
*H02H 7/125* (2006.01)
(52) U.S. Cl. ........................................ 363/127; 363/53
(58) Field of Classification Search ............. 363/21.06, 363/21.14, 52, 53, 90, 125, 127
See application file for complete search history.

(56) References Cited

U.S. PATENT DOCUMENTS 6,169,683 B1 * 1/2001 Farrington .................. 363/127
6,445,597 B1 * 9/2002 Boylan et al. ............ 363/21.06
6,785,151 B2 * 8/2004 Ingman et al. .............. 363/127
6,980,441 B2 * 12/2005 Man-ho .................... 363/21.06

FOREIGN PATENT DOCUMENTS

JP  2003-189608  7/2003

* cited by examiner

*Primary Examiner*—Jessica Han
(74) *Attorney, Agent, or Firm*—Armstrong, Kratz, Quintos, Hanson & Brooks LLP

(57) ABSTRACT

A synchronous rectification circuit of a switching power supply device where circuit elements such as rectification switch elements are protected when an abnormality occurs in an output of a transformer, wherein a (fault) detecting circuit detects an abnormality of a trigger signal transmitted from a transformer, a shutoff circuit quickly cuts off a discharge route of an inductor (coil) forming a gate drive signal source of a first transistor (NMOS transistor) when the (fault) detecting circuit detects an abnormality, and a (linear) driver holds (clamps) a drain-source voltage of the NMOS transistor at a constant voltage and turns on the NMOS transistor by that constant voltage so as to prevent it from turning off immediately when the detecting circuit detects an abnormality.

4 Claims, 13 Drawing Sheets

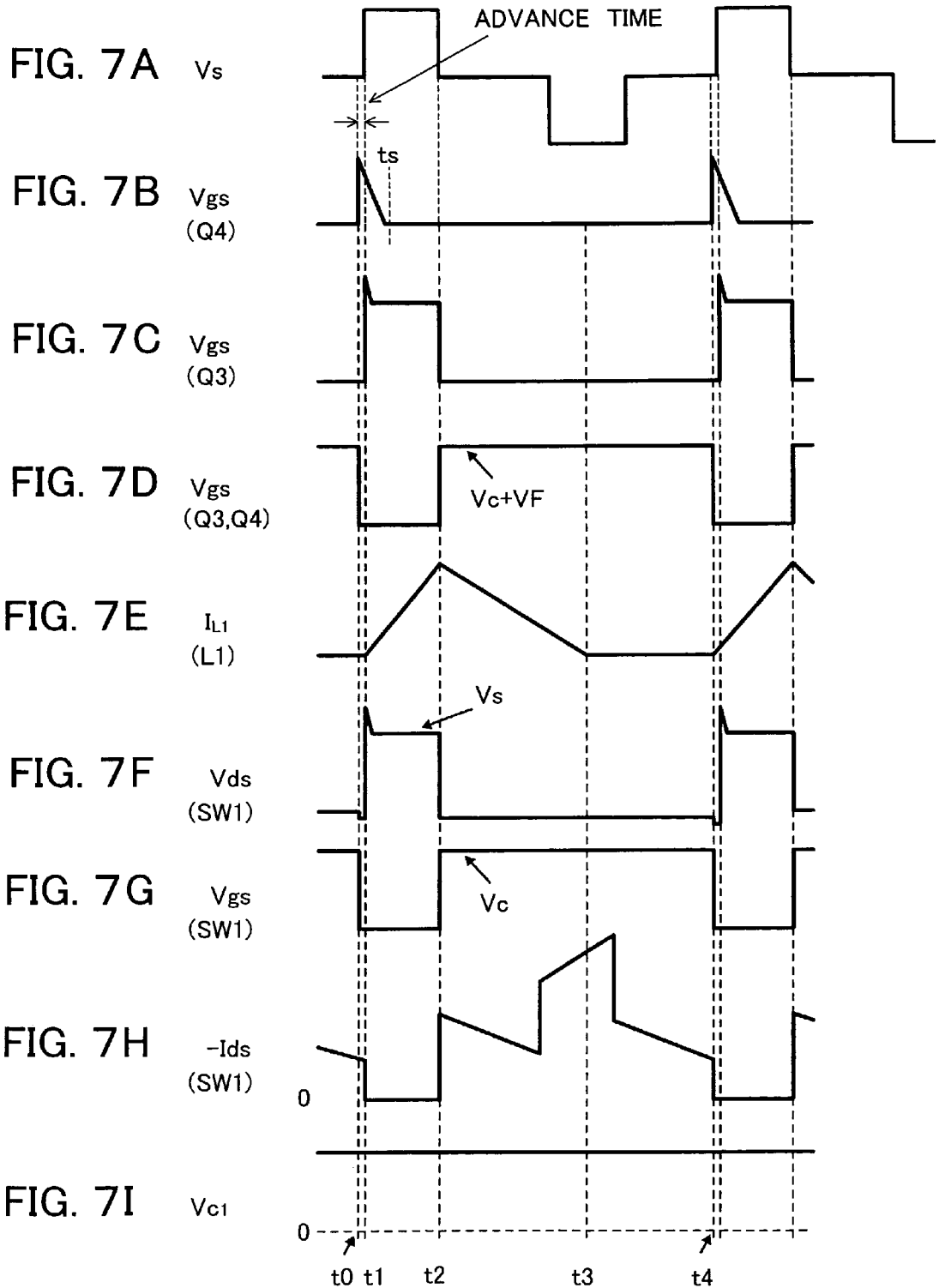

FIG. 8A  Vs 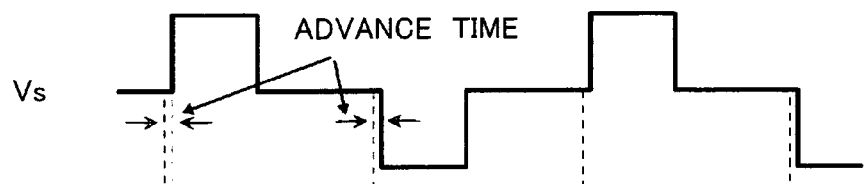
FIG. 8B  Vt1 
FIG. 8C  Vds (SW1) 
FIG. 8D  Vgs (SW1) 
FIG. 8E  Vt2 
FIG. 8F  Vds (SW2) 
FIG. 8G  Vgs (SW2) 

SYNCHRONOUS RECTIFICATION CIRCUIT

BACKGROUND OF THE INVENTION

1. Field of the Invention

The present invention relates to a switching power source for generating a desired voltage by switching of DC voltage, voltage conversion, and synchronous rectification, more particularly relates to technique for protection of the synchronous rectification circuit.

2. Description of the Related Art

FIGS. 1A and 1B show the circuit configurations of conventional synchronous rectification circuits in switching power sources as disclosed in Japanese Patent Publication (A) No. 2003-189608 (secondary side circuits of transformers).

The circuit shown in FIG. 1A is a current doublers type synchronous rectification circuit. This circuit is the most generally used synchronous rectification circuit directly driving switch elements SW100 and SW200 (NMOS transistors) by an output of a secondary winding of the transformer. In the circuit shown in FIG. 1A, however, when the power source output is stopped, the charge stored in an output capacitor C0 passes through the secondary winding and turns on the switch elements SW100 and SW200, so sometimes induces breakage of these elements.

FIG. 1B shows a synchronous rectification circuit for controlling the ON and OFF states of the switch elements SW100 and SW200 not by directly driving the switch elements SW100 and SW200 (NMOS transistors) from the output of the secondary winding of the transformer, but by combining for example a not shown auxiliary winding and control circuit. In this synchronous rectification system, a rectification efficiency can be raised in comparison with the circuit shown in FIG. 1A.

However, in the synchronous rectification circuit shown in FIG. 1B as well, sometimes the drain-source voltages of the switch elements SW100 and SW200 exceed a withstand voltage level and induce breakage of these elements when no protection circuit is provided. Below, the mechanism by which breakage of the switch elements is induced will be explained with reference to FIGS. 2A and 2B.

FIGS. 2A and 2B are diagrams for explaining a current path in the conventional synchronous rectification circuit shown in FIG. 1B, in which FIG. 2A shows a case of no load output, and FIG. 2B shows a case after the transformer output is suspended. In the synchronous rectification circuit shown in FIG. 1B, when the power source supply has no load, since there is no current flowing in a load, the current flowing in a transformer Tm circulates through coils L10 and L20, switch elements SW100 and SW200, and the output capacitor C0 as shown in FIG. 2A. The currents flowing in the coils L10 and L20 become 0 when totaled in the reverse directions. At this time, assume that the switch element SW100 is in an ON state, and the switch element SW200 is in an OFF state.

At this time, when the drive signal on a primary side of the transformer Tm is suspended due to an abnormality, the output voltage of the transformer Tm immediately becomes 0V, but according to any configuration of the control circuit, the switch element SW100 sometimes was continuously kept ON since the time before that. Then, as shown in FIG. 2B, the current flows in reverse through the output capacitor C0, that is, the current of the output capacitor C0 is discharged through the switch element SW100. In such case, the switch element SW100 may break due to the rise of the discharge current unless the switch element SW100 is forcibly turned off. However, if the switch element SW100 is forcibly turned off here, there will no longer be a discharge loop for releasing the energy of the coils L10 and L20 (since the escape route of the current is lost), so there is a possibility that high voltages will be induced between the drains and sources of the switch elements SW100 and SW200 and these elements will be broken.

SUMMARY OF THE INVENTION

It is therefore desirable in the present invention to provide a synchronous rectification circuit and switching power supply device able to protect rectification switch elements even when an abnormality occurs in the output voltage of the transformer.

According to the present invention, there is provided a synchronous rectification circuit comprising a main transformer for transmitting a first voltage in accordance with a duty ratio of a PWM signal; a first N channel transistor having a drain connected to a first node formed by one end of a secondary winding of the main transformer, having a source connected to a reference potential terminal, and rectifying a current generated in the secondary winding; an auxiliary transformer for outputting a trigger signal having a phase advanced by a level change of the first voltage; an inductor connected between the first node and a second node; a first transistor for controlling a conduction state between the second node and a gate of the first N channel transistor in accordance with the potential of the second node and charging the gate of the first N channel transistor by a discharge of the inductor when the first N channel transistor turns on; a second transistor for controlling the conduction state between the gate of the first N channel transistor and the reference potential terminal in accordance with the potential of the second node and serving the gate of the first N channel transistor as the reference potential when the first N channel transistor turns on; a third transistor for controlling the conduction state between the second node and the reference potential terminal in accordance with the potential of the first node; a fourth transistor for controlling the conduction state between the second node and the reference potential terminal in accordance with the trigger signal; a detection circuit including a fifth transistor turning off when a level of the trigger signal not less than a first threshold value and turning on when the level is lower than the first threshold value and detecting an abnormality of a trigger signal; a shutoff circuit including a sixth transistor for controlling the conduction between the inductor and the first transistor, turning on when the fifth transistor turns off, and turning off when the fifth transistor turns on, cutting off a discharge route of the inductor responsive to detection of an abnormality of the trigger signal; and a drive circuit including a seventh transistor connected between the first node and the second node and turning on or off in cooperation with the fifth transistor, holding the first N channel transistor in its drain-source voltage at a constant voltage and, at the same time, turning on the first transistor by that constant voltage when the seventh transistor turns on.

In the synchronous rectification circuit of the present invention, when the detection circuit detects an abnormality of the trigger signal and the fifth transistor turns on, the sixth transistor of the shutoff circuit is turned off to shut off the conduction between the inductor and the first transistor. Due to this, the connection with a signal source for driving the gate of the first N channel transistor rectification switch element to function as a rectification switch element is quickly cut off.

Further, in the drive circuit, when the fifth transistor turns on, the seventh transistor turns on in cooperation and the drain-source voltage of the first N channel transistor is held at a constant voltage. At the same time, the first transistor turns on by that constant voltage. Accordingly, until the discharge current of the output inductor etc. is completely consumed, the ON state of the first N channel transistor is maintained.

In the present invention, preferably, the fifth transistor is connected between the third node and the reference potential terminal, and the drive circuit further has a first diode connected between the third node and the third transistor and turning off the third transistor when the fifth transistor turns on and a second diode connected between the third node and the gate of the seventh transistor and generating a constant voltage when the fifth transistor turns on.

In the present invention, preferably, the shutoff circuit is provided between the base of the first transistor and the third node with a first resistor for adjusting a base current of the first transistor when the fifth transistor turns on.

According to the synchronous rectification circuit of the present invention, therefore, even in the case where an abnormality occurs in the output voltage of the transformer, circuit elements such as the rectification switch element (first N channel transistor) etc. can be protected.

BRIEF DESCRIPTION OF THE DRAWINGS

These and other objects and features of the present invention will become clearer from the following description of the preferred embodiments given with reference to the attached drawings, wherein:

FIGS. 7A to 7I are timing charts showing the operation of the drive circuit in the reference device;

FIGS. 8A to 8G are timing charts showing the operation of a rectification switch element in the reference device;

DESCRIPTION OF THE PREFERRED EMBODIMENTS

For simplifying understanding, first the configuration and operation of a switching power supply device 1 forming the basis of the present invention will be explained.

Configuration of Switching Power Supply Device 1

Figure 1A:
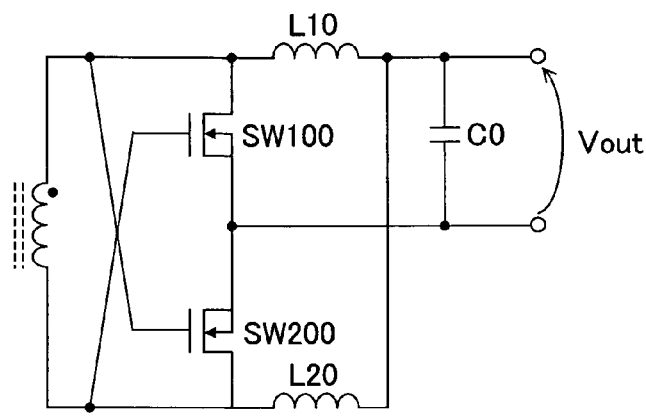
FIGS. 1A and 1B are diagrams showing circuit configurations of synchronous rectification circuits of switching power sources in the related art (secondary side circuits of transformers)
Figure 1B:
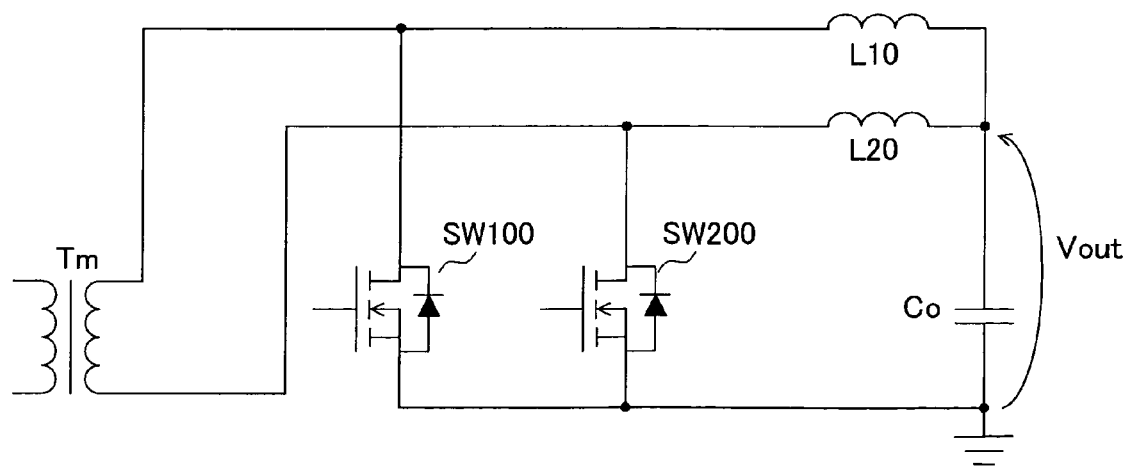
Figure 2A:
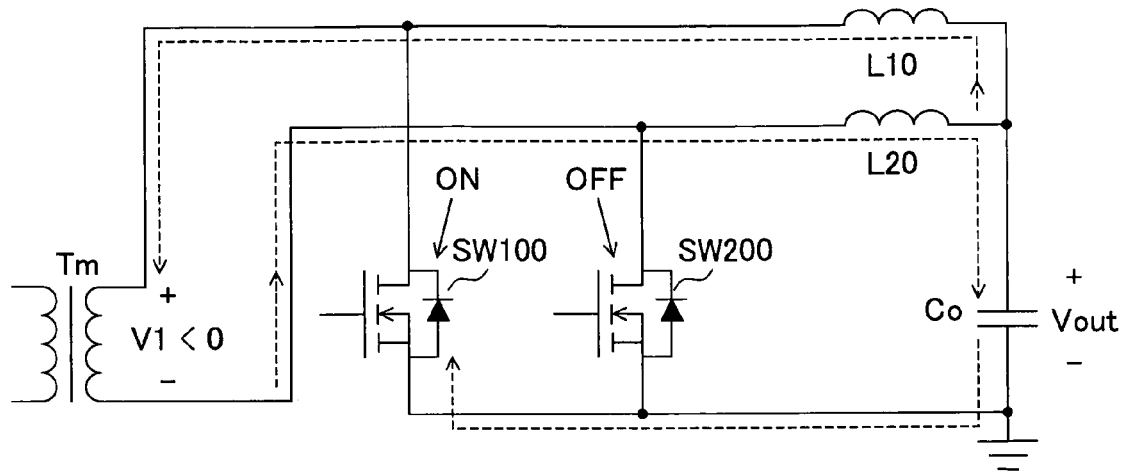
FIGS. 2A and 2B are diagrams showing a current path at the time of operation in the synchronous rectification circuit of a switching power supply device of the related art;.
Figure 2B:
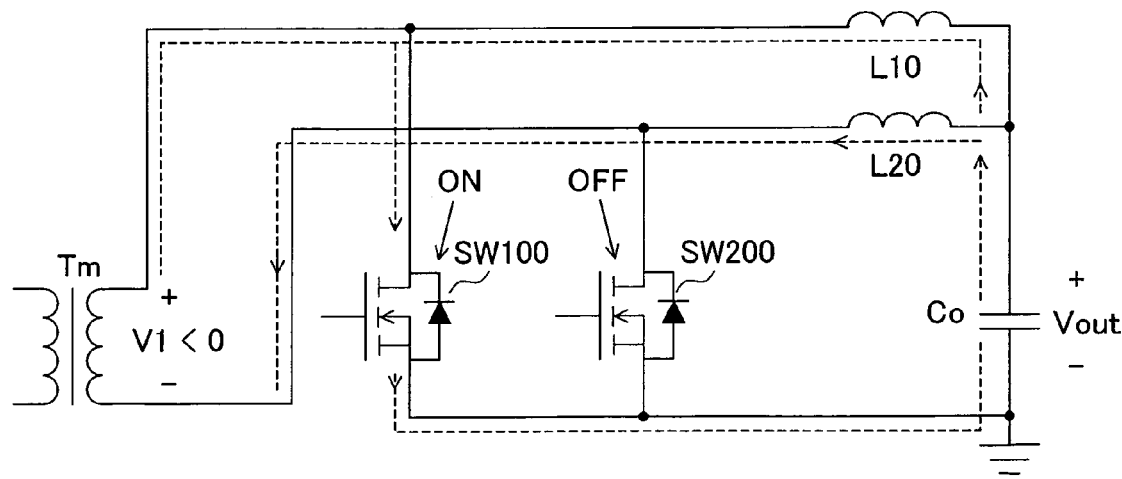
Figure 3:
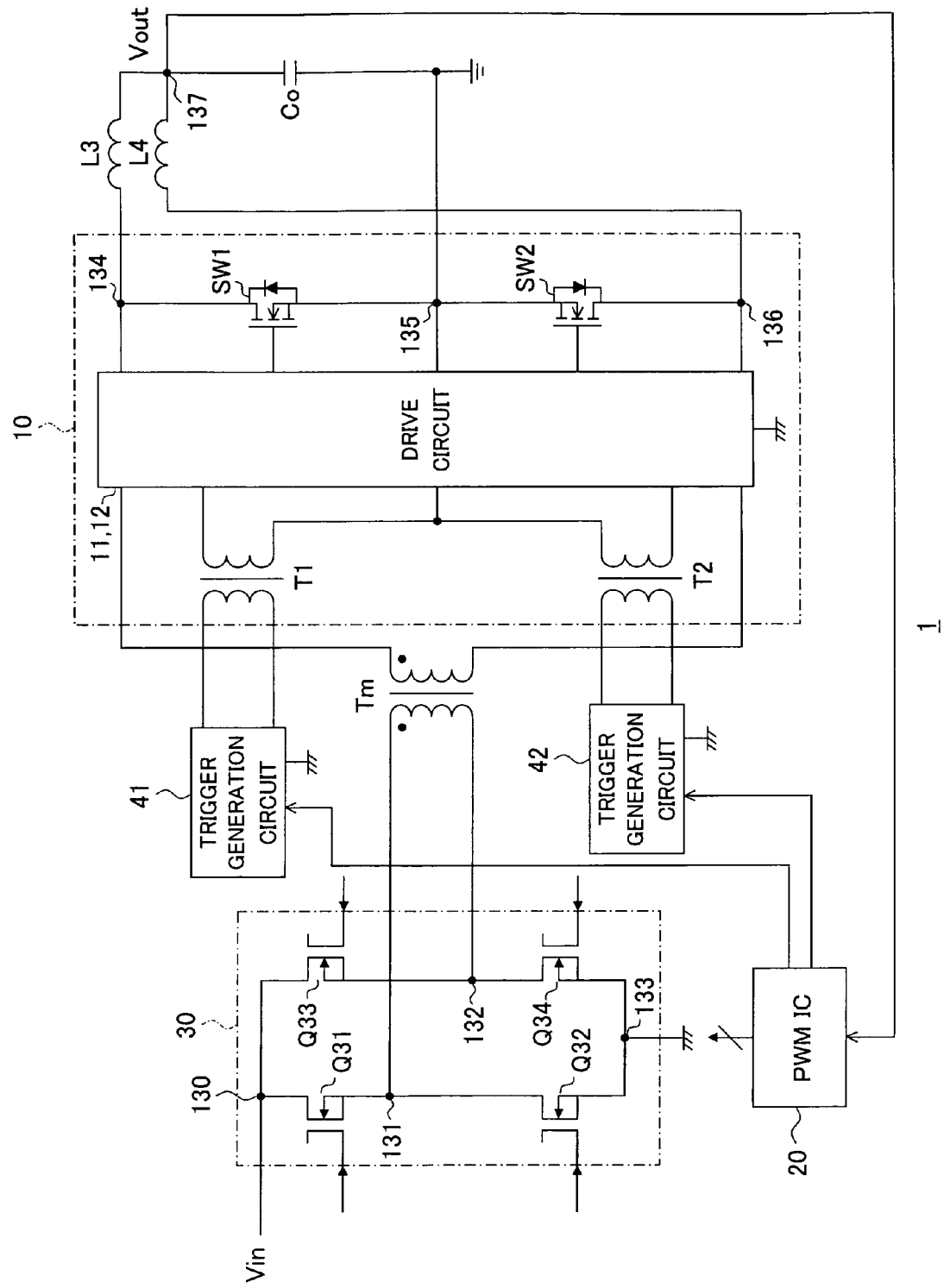
FIG. 3 is a block diagram showing the circuit configuration of a switching power supply device according to a reference device.

FIG. 3 is a block diagram showing the circuit configuration of a switching power supply device 1. The switching power supply device 1 includes a full bridge type switching circuit 30, a synchronous rectification circuit 10 for synchronous rectification of the output voltage of a transformer Tm, and a PWM control circuit (PWM IC) 20 for controlling the switching circuit based on an output voltage Vout as principal components. Further, the switching power supply device 1 shown in FIG. 3 has a current doubler type output including coils L3 and L4.

The switching circuit 30 is configured by four NMOS transistors Q31 to Q34 and operates when control signals from the PWM control circuit 20 are given to gates of the NMOS transistors.

As shown in FIG. 3, a drain of the NMOS transistor Q31 is connected to a node 130 to which a DC voltage Vin is applied, and its source is connected to a node 131 formed by one end of a primary winding of the transformer Tm. A drain of the NMOS transistor Q32 is connected to the node 131, and its source is connected to the ground terminal 133. A drain of the NMOS transistor Q33 is connected to the node 130, and its source is connected to the node 132 formed by the other end of the transformer Tm. A drain of the NMOS transistor Q34 is connected to the node 132, and its source is connected to the ground terminal 133.

In the switching circuit 30, gates of the NMOS transistors are controlled by the PWM control circuit 20 so that a first period during which the voltage induced in the primary winding of the transformer Tm becomes a plus voltage by both of the NMOS transistors Q31 and Q34 turning on and a second period during which the voltage induced in the primary winding of the transformer Tm becomes a minus voltage by both of the NMOS transistors Q32 and Q33 turning on alternate. The transformer Tm transmits the voltage generated on the primary side to the secondary side insulated to the switching circuit 30.

Both of the trigger signal generation circuits 41 and 42 are connected to the PWM control circuit 20. The trigger signal generation circuit 41 is connected to the primary winding of the transformer T1, and the trigger signal generation circuit 42 is connected to the primary winding of the transformer T2. The trigger signal generation circuits 41 and 42 are given PWM signals from the PWM control circuit 20 and generate trigger signals having narrow widths based on these PWM signals. An example of the specific circuit configuration of the trigger signal generation circuit will be explained later.

The synchronous rectification circuit 10 is configured by transformers T1 and T2, drive circuits (drive circuits 11 and 12 explained later), and NMOS transistors SW1 and SW2 serving as the rectification switch elements. The transformers T1 and T2 are connected at their primary windings to the trigger signal generation circuits 41 and 42 and are connected at their secondary windings to the drive circuits. Namely, the transformers T1 and T2 transmit trigger signals generated by the trigger signal generation circuits 41 and 42 to the drive circuits while insulating them.

A gate of the NMOS transistor SW1 is connected to a drive circuit (drive circuit 11 explained later), and a gate of the NMOS transistor SW2 is connected to a drive circuit (drive circuit 12 explained later). A drain of the NMOS transistor SW1 is connected to a node 134. The node 134 is connected to an output terminal 137 outputting Vout via the coil L3. A drain of the NMOS transistor SW2 is connected to a node 136. The node 136 is connected to the output terminal 137 outputting Vout via the coil L4. Sources of the NMOS transistors SW1 and SW2 are connected via a node 135. The capacitor C0 is connected between the output terminal 137 and the ground terminal.

By the connection of the synchronous rectification circuit 10, coils L3 and L4, and the capacitor C0 explained above, a current doubler type output circuit is configured. By this current doubler output circuit, there is the advantage that currents $I_{L3}$ and $I_{L4}$ flowing in the coils L3 and L4 are shifted in phases by 180 degrees from each other, whereby current ripples are cancelled.

In the drive circuit, when the voltage induced in the secondary winding of the transformer Tm is a plus voltage, the NMOS transistor SW1 is turned off. Further, when the voltage induced in the secondary winding of the transformer Tm is a minus voltage, the NMOS transistor SW2 is turned off. By this rectification operation, the desired DC voltage output Vout is generated in the output terminal 137.

Further, as shown in FIG. 3, the output terminal 137 is connected to the PWM control circuit 20. Due to this, the output voltage Vout is fed back to the PWM control circuit 20 for the stabilization of system. The PWM control circuit 20 controls duty ratios of the PWM signals given to the NMOS transistors Q31 to Q34 of the switching circuit 30 in accordance with the fed back output voltage Vout.

Figure 4:
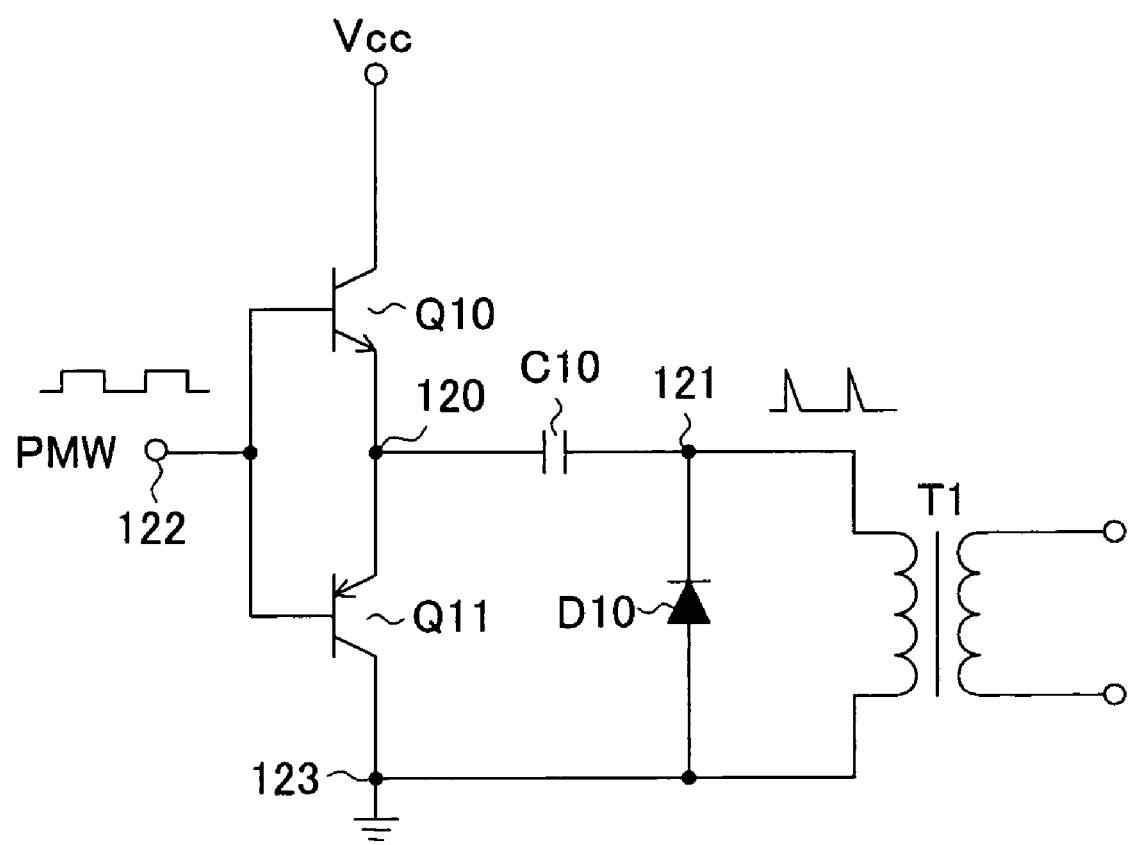
FIG. 4 is a circuit diagram showing an example of the configuration of a trigger signal generation circuit in the reference device.

FIG. 4 is a circuit diagram showing an example of the configuration of the trigger signal generation circuit 41.

In FIG. 4, transistors Q10 and Q11 are transistors for current amplifying PWM signals. The capacitor C10 is a capacitor for charging and discharging a small capacity of about several tens to several hundreds of pF. The diode D10 is a diode for resetting the transformer T1.

An input terminal 122 for inputting the PWM signal is connected to bases of the transistors Q10 and Q11. Emitters of the transistors Q10 and Q11 are connected to each other via a node 120. A collector of the transistor Q10 is connected to a power supply terminal of Vcc. The collector of the transistor Q11 is connected to a node (ground node) 123 of the ground terminal.

The winding on the primary side of the transformer T1 is connected between a node 121 and the node 123. The capacitor C10 is connected between the node 120 and the node 121. The diode D10 is connected between the node 121 and the ground node 123 parallel to the winding on the primary side of the transformer T1.

In the circuit of FIG. 4, when the PWM signal changes from the L level (low level) to H level (high level), an NPN type transistor Q10 turns on, and a PNP type transistor Q11 turns off. Due to this, the capacitor C10 is charged through a route of the primary winding of Vcc→transistor Q10→node 120→capacitor C10→transformer T1. Once the charging of the capacitor C10 is completed, the diode D10 is forcibly turned on by the current flowing in the primary side coil of the transformer T1 and resets the transformer T1.

In the circuit of FIG. 4, when the PWM signal changes from the H level (high level) to the L level (low level), the NPN type transistor Q10 turns off, and the PNP type transistor Q11 turns on. Charges stored in the capacitor C10 are discharged through the route of the capacitor C10→transistor Q11→diode D10→capacitor C10 by this.

By the above operation, the voltage applied to the primary winding of the transformer T1 becomes the trigger signal at a time responsive to the rising of the input PWM signal.

The trigger signal generation circuit 42 has the same circuit configuration as that of the trigger signal generation circuit 41. It is supplied with a PWM signal different in phase by 180 degrees with respect to the PWM signal supplied to the trigger signal generation circuit 41. Due to this, the trigger signal applied to the transformer T2 becomes a signal different in phase by 180 degrees in comparison with the trigger signal applied to the transformer T1.

Note that, in the switching power supply device 1, as will be explained later, the trigger signal generated by the trigger generation circuit must be advanced in the phase of the rising time just a little with respect to the signal input to the transformer Tm.

In this point, the PWM control circuit 20 supplies the same PWM signal to the switching circuit 30 and the trigger generation circuits 41 and 42. There is a response delay of the transistor (FET) in the switching circuit 30, therefore the trigger signal is naturally advanced in the phase of the rising time just a little with respect to the signal input to the transformer Tm. Further, the PWM control circuit 20 may be configured so as to control the output timings of the PWM signal given to the switching circuit 30 and the PWM signal given to the trigger generation circuit so that the phase of the rising time is advanced by exactly the required amount.

Figure 5:
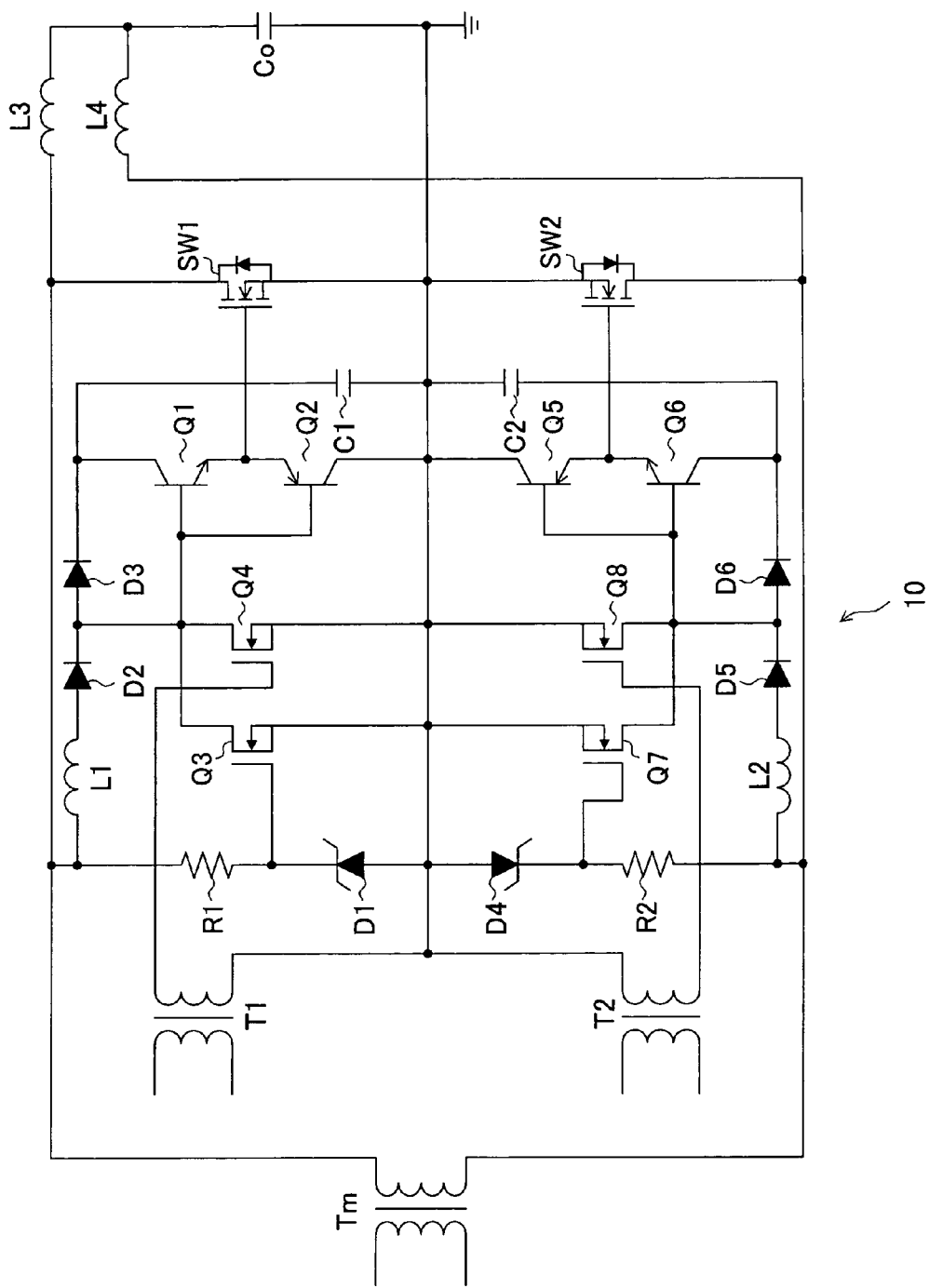
FIG. 5 is a circuit diagram of the synchronous rectification circuit in the reference device.

FIG. 5 is a diagram showing the circuit configuration of the synchronous rectification circuit 10.

In the switching power supply device 1, the transformer Tm alternately outputs a plus voltage and a minus voltage. When outputting the plus voltage, the NMOS transistor SW1 is controlled to turn off, while when outputting the minus voltage, the NMOS transistor SW2 is controlled to turn off. Note that when there is no output from the transformer Tm, both of the NMOS transistors SW1 and SW2 turn on, and a commutation state where the energy stored in the coil L3 or L4 is released is exhibited.

The synchronous rectification circuit 10 is configured by two systems of drive circuits performing the same operation for controlling the NMOS transistors SW1 and SW2. Namely, the synchronous rectification circuit 10 has the drive circuit 11 for the NMOS transistor SW1, and the drive circuit 12 for the NMOS transistor SW2.

As shown in FIG. 5, the circuit configurations of the drive circuits have a symmetric relationship about a ground potential line. Accordingly, below, the configuration and operation of only the drive circuit 11 for driving the NMOS transistor SW1 will be explained with reference to the circuit diagram shown in FIG. 6.

Configuration of Drive Circuit 11

Figure 6:
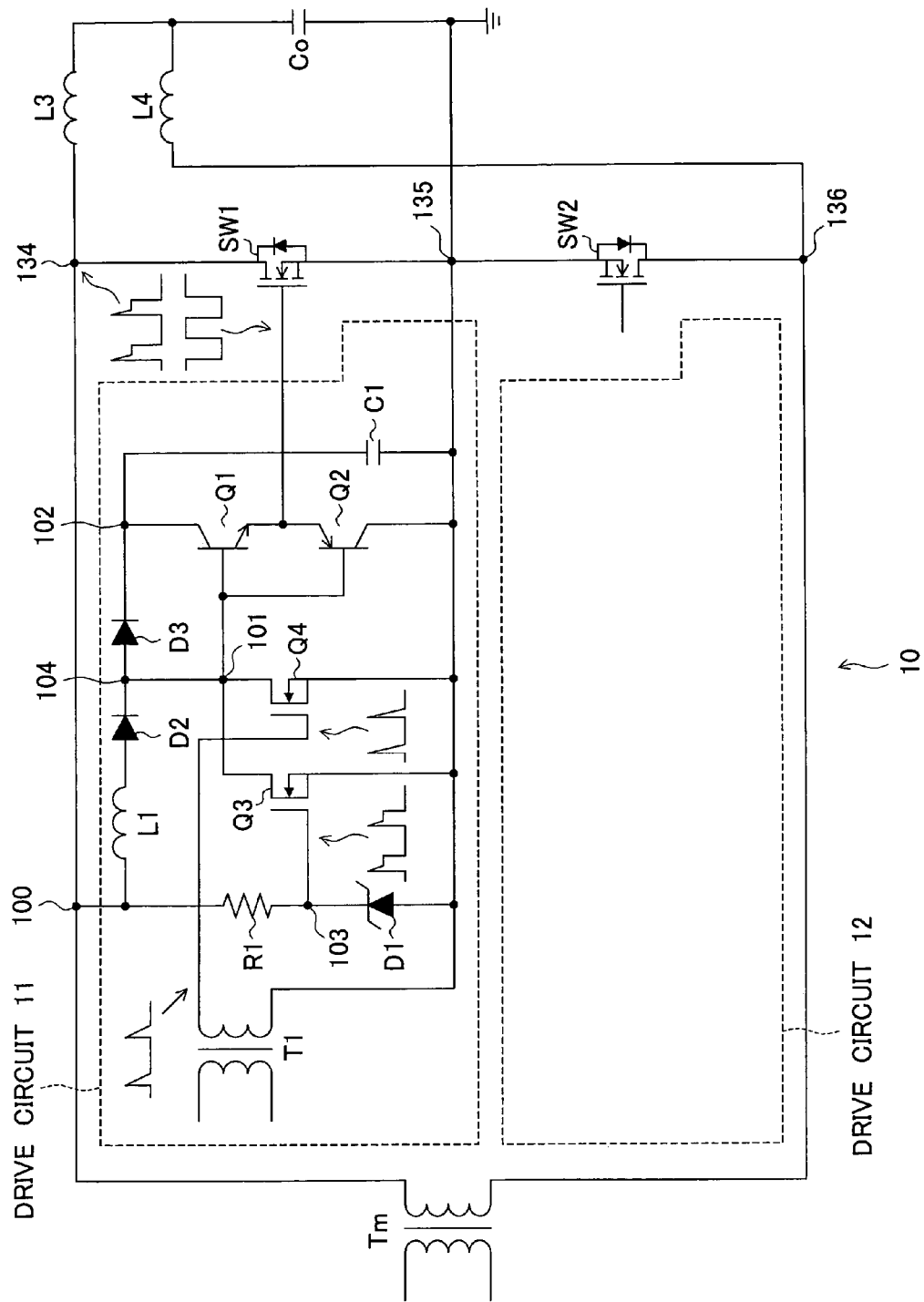
FIG. 6 is a circuit diagram of a drive circuit of the switching power supply device according to the reference device.

In FIG. 6, the NMOS transistor Q4 is a control transistor for controlling the potential level of a node 101. The NMOS transistor Q4 is connected at its gate to one end of the secondary winding of the transformer T1, connected at its source to the ground terminal 135, and connected at its drain to bases of the transistors Q1 and Q2. Accordingly, it turns on responsive to the rising of the trigger signal vt1, and the node 101 is brought to the ground potential.

The transistor Q2 is a control transistor for controlling the NMOS transistor SW1. An emitter of the transistor Q2 is connected to the gate of the NMOS transistor SW1, and its collector is connected to the ground terminal 135. The base of the transistor Q2 is connected to the drain of the NMOS transistor Q3 via the node 101.

Accordingly, the transistor Q2 turns on when the potential level of the node 101 becomes the ground potential, drains the gate charge of the NMOS transistor SW1, and turns off the NMOS transistor SW1.

The transistor Q1 is a control transistor for controlling the NMOS transistor SW1. An emitter of the transistor Q1 is connected to the gate of the NMOS transistor SW1, and a collector is connected to a node 102. The base of the transistor Q1 is connected to the drain of the NMOS transistor Q3 via the node 101.

In the state where the transistor Q1 turns on, due to the discharge current of the coil L1, the gate of the NMOS transistor SW1 is charged through the route of the base→emitter and, at the same time, due to the charge voltage of the capacitor C1, the gate of the NMOS transistor SW1 is charged through the route of the collector→emitter.

The NMOS transistor Q3 is a control transistor for controlling the potential level of the node 101. The trigger signal Vt1 returns to 0V for a shorter time than the time of the output voltage Vs of the transformer Tm maintaining the H level, therefore during a period where Vs maintains the H level after the trigger signal Vt1 becomes 0V, by the NMOS transistor Q3 turning on, the node 101 is brought to the ground potential.

A gate of the NMOS transistor Q3 is connected to a node 103 forming an intermediate node of the resistor R1 and the diode D1, its drain is connected to the node 101, and its source is connected to the ground terminal 135.

Note that a node 100 is a node existing between one end of the transformer Tm and the drain of the NMOS transistor SW1. Between this node 100 and the ground terminal 135, the resistor R1 and the diode D1 are connected. The node 103 formed by the node between the resistor R1 and the diode D1 is connected to the gate of the NMOS transistor Q3. The diode D1 and the resistor R1 configure a protection circuit for protecting so that the gate potential level of the NMOS transistor Q3 can be adjusted.

The coil L1 and the diode D2 are connected in series between the node 100 and a node 104. The diode D3 is connected between the node 104 and the node 102. The node 104 and the node 101 are connected. The node 101 is connected to bases of the transistors Q1 and Q2 for controlling the NMOS transistor SW1.

Due to this, when the output voltage Vs of the transformer Tm is at the H level, that is, when the node 100 is at the H level, the energy is stored by the current $I_{L1}$ of the coil L1, while when the output voltage Vs of the transformer Tm is at the L level, that is, when the node 100 is at the L level, the stored energy is released. This released energy charges the gate of the NMOS transistor SW1, whereby the NMOS transistor SW1 is quickly turned on. At the same time, the excess released energy is stored in the capacitor C1.

The capacitor C1 is connected between the node 102 and the ground terminal 135.

The capacitor C1 clamps the gate-source voltage Vgs of the NMOS transistor SW1 by the charge voltage Vc1 via the transistor Q1. Further, the capacitor C1 has a role as an auxiliary power source for quickly charging the gate of the NMOS transistor SW1 via the collector and emitter of the transistor Q1 by the charge voltage Vc1 and turning on it when the output voltage Vs of the transformer Tm becomes the L level.

Operation of Drive Circuit 11

Next, the operation of the drive circuit 11 will be explained with reference to FIG. 7.

FIGS. 7A to 7I are timing charts of parts for explaining the operation of the drive circuit 11, in which FIG. 7A shows the output voltage Vs of the transformer Tm, FIG. 7B shows the gate-source voltage Vgs of the NMOS transistor Q4, FIG. 7C shows the gate-source voltage Vgs of the NMOS transistor Q3, FIG. 7D shows drain-source voltages Vds of the NMOS transistors Q3 and Q4, FIG. 7E shows the current $I_{L1}$ flowing in the coil L1, FIG. 7F shows the drain-source voltage Vds of the NMOS transistor SW1, FIG. 7G shows the gate-source voltage Vgs of the NMOS transistor SW1, FIG. 7H shows a drain current Ids of the NMOS transistor SW1, and FIG. 7I shows the charge voltage Vc1 of the capacitor C1.

Below, the operation of the drive circuit 11 will be explained in sequence for the time from t0 to t4 as one cycle of the output voltage Vs of the transformer Tm in the timing charts of FIGS. 7A to 7I.

(i) Time from t0 to t1

At the time t0, as shown in FIG. 7B, the trigger signal Vt1 advanced in rising time by a predetermined time with respect to Vs is output from the transformer T1. Due to this, the NMOS transistor Q4 quickly turns on, and the node 101, that is, the bases of the transistors Q1 and Q2, becomes the ground potential (FIG. 7D). Then, the transistor Q2 turns on, and the gate charge of the NMOS transistor SW1 is discharged to the ground through the transistor Q2, whereby the NMOS transistor SW1 quickly turns off (FIG. 7G).

Note that the reason for the trigger signal Vt1 rising a little advanced with respect to the rising time of the output voltage Vs of the transformer Tm is that the drain voltage of the NMOS transistor SW1 rises by the rise of the output voltage Vs of the transformer Tm, therefore when the NMOS transistor SW1 has become ON at the point of time when the drain voltage rises, a large penetration current is induced between the drain and source of the NMOS transistor SW1. This is not desired from the viewpoints of drive efficiency and power consumption. Accordingly, by turning on the NMOS transistor Q4 and the transistor Q2 early by the trigger signal Vt1, the NMOS transistor SW1 is turned off before the drain voltage of the NMOS transistor SW1 rises.

Note that it is not always better that the advance time be longer. When the advance time is too long, the commutation time of the NMOS transistor SW1 becomes long, and the efficiency of the switching power supply device 1 is lowered. Accordingly, when the switching power supply device 1 is operated with a high frequency, the advance time is desirably for example about 20 to 50 ns.

Note that, the NMOS transistor SW1 is commutated since the time before t0. Then, even when the NMOS transistor SW1 turns off, a parasitic diode is continuously turned on, therefore the commutation state continues. Namely, the drain-source voltage Vds of the NMOS transistor SW1 becomes minus $V_F$: ($V_F$: forward voltage of the parasitic diode) Therefore, even in the state where the NMOS transistor Q4 is continuously turned on from the time t0 to the time t1, the current flowing in the coil L1 is 0 as it is and does not change (FIG. 7E). Further, the period from t0 to t1 is short, therefore the loss due to the forward direction current of the parasitic diode is very small.

(ii) Time from t1 to t2

When the time t1 arrives, as shown in FIG. 7A, the output voltage Vs of the transformer Tm rises with a small delay from the trigger signal Vt1. At this point of time, as shown in FIG. 7B, the voltage level of the trigger signal Vt1 is lowered from a peak level, but has become a level of an extent maintaining the NMOS transistor Q4 in the ON state. The voltage of the node 100, that is, the drain voltage of the NMOS transistor SW1, rises in response to the rising of the output voltage Vs of the transformer Tm, therefore the node 103 rises to a voltage level lower from the potential of the node 100 by exactly the voltage drop of the resistor R1 and turns on the NMOS transistor Q3.

The node 101 is maintained at the ground potential, therefore, when the forward direction voltage drop of the diode D2 is $V_F$, after the potential of the node 100 becomes larger than $V_F$, as shown in FIG. 7E, the current $I_{L1}$ flowing in the coil L1 begins to rise from 0. Further, since the node 101 is at the ground potential, the state where the transistor Q2 remains in the ON state, and the gate of the NMOS transistor SW1 is short-circuited to the ground potential continues (FIG. 7G).

While the energy is stored in the coil L1, the state where the gate of the NMOS transistor SW1 is short-circuited to the ground continues. Thereafter, at the time ts earlier than the time t2 (see FIG. 7B), the trigger signal Vt1 becomes sufficiently small, and the NMOS transistor Q4 turns off earlier than the NMOS transistor Q3. During the time from ts to t2, the NMOS transistor Q3 continues to be in the ON state, therefore the current $I_{L1}$ of the coil L1 rises (FIG. 7E), and the NMOS transistor SW1 remains in the OFF state (FIG. 7G).

(iii) Time t2

When the time t2 arrives and the output voltage Vs of the transformer Tm becomes 0, the potential of the node 100 is lowered. The potential of the node 103 is also lowered in response to this. Accordingly, the gate-source voltage Vgs is lowered and the NMOS transistor Q3 turns off. Further, the NMOS transistor Q4 has turned off before the time t2.

Note that, when

Vs: output voltage of transformer Tm;

L: inductance of coil L1; and $F_{SW}$: synchronous rectification frequency of NMOS transistor SW1, the current $I_{L1}$ flowing in the coil L1 at a time tx (t1≦tx≦t2) and the energy (or electric power) $E_{L1}$ stored in the coil L1 at the time t2 become as in the following Equations (1) and (2):

$$I_{L1} = Vs \cdot (tx - t1)/L \quad (1)$$

$$E_{L1} = I_{L1}^2 \cdot L \cdot f_{sw}/2 = 0.5 \cdot [Vs \cdot (t2-t1)]^2 \cdot f_{sw}/L \quad (2)$$

Here, where $K_C$ is defined as in the following Equation (3), $E_{L1}$ can be written as shown in Equation (4):

$$K_C = [Vs \cdot (t2-t1)]^2 \cdot f_{sw}/2 \quad (3)$$

$$E_{L1} = K_C/L \quad (4)$$

The energy indicated by the above Equation (4) is consumed in the transistors Q1 and Q2 by charging and discharging the gate of the NMOS transistor SW1, therefore becomes equal to the $(1/2) \cdot C_{iss} \cdot Vc1^2 \cdot f_{sw}$ of the charge/discharge power relating to the gate input capacitor $C_{iss}$ of the NMOS transistor SW1, so the charge voltage Vc1 of the capacitor C1 is determined. Namely, the voltage Vc1 is controlled in accordance with the output voltage Vs of the transformer Tm.

(iv) Time from t2 to t3

As explained above, the NMOS transistors Q3 and Q4 turn off from the time t2, therefore the current $I_{L1}$ flowing in the coil L1 becomes the base current of the transistor Q1 and turns on the transistor Q1. At that time, the OFF state of the transistor Q2 is maintained.

The current $I_{L1}$ flows through the base and emitter of the transistor Q1 and charges the gate of the NMOS transistor SW1. Namely, the energy stored in the coil L1 over the time from t2 to t3 charges the gate of the NMOS transistor SW1. On the other hand, the charge stored in the capacitor C1 over the time from t2 to t3 flows through the route of the node 102→collector of transistor Q1→emitter→gate of NMOS transistor SW1 and contributes to the quick charging of the gate of the NMOS transistor SW1. Accordingly, immediately after the time t2, due to the two systems of the energy release from the coil L1 and the discharge of the capacitor C1, it becomes possible to switch the NMOS transistor SW1 from OFF to ON at a high speed.

On the other hand, after the gate of the NMOS transistor SW1 is completely charged, the energy remaining in the coil L1 turns on the diode D3 and charges the capacitor C1. Due to this, the voltage driving the NMOS transistor SW1 is clamped at the voltage value Vc1 of the capacitor C1 and, at the same time, the capacitor C1 functions as an auxiliary power supply.

Note that, as shown in FIG. 3, the switching power supply device 1 is configured so that the duty ratio of the PWM signal is controlled by the PWM control circuit 20 based on feedback of the output voltage for stabilization of the output voltage. The output voltage Vs of the transformer Tm is stabilized by this. Accordingly, even when the input voltage of the switching power supply device 1 severely fluctuates, the value of Vs·(t2−t1) in the above Equation (3) does not substantially change, and Kc becomes a constant. Therefore, the energy $E_{L1}$ which becomes necessary for the drive circuit 11 can be easily set in accordance with an inductance L of the coil L1, and further the charge voltage Vc1 can be set in accordance with the energy $E_{L1}$.

At the time t3, when the energy remaining in the coil L1 is completely transferred to the capacitor C1, as shown in FIG. 7E, the current value of the coil L1 becomes 0 again.

(v) Time from t3 to t4

At the time t3, all of the energy of the coil L1 is released, $I_{L1}=0$ (FIG. 7E), and the diodes D2 and D3 turn off. Further, the NMOS transistors Q3 and Q4 are OFF as they are. Therefore, charges stored in an output capacitor $C_{oss}$ of the NMOS transistors Q3 and Q4 cannot be discharged. As a result, the base voltages of the transistors Q1 and Q2 continuously remain at the H level, and for the time from t3 to t4, as shown in FIG. 7G, the NMOS transistor SW1 remains in the ON state.

Above, the operation of the drive circuit 11 was explained with reference to the timing charts of FIGS. 7A to 7I. Here, the major characteristic feature of the switching power supply device 1 resides in that the state where the NMOS transistor SW1 is always ON is maintained as shown in FIG. 7G during the time from t2 to t4. Namely, both in the case where the NMOS transistor SW1 is commutated and the case where the output results from the operation of the NMOS transistor SW1, the NMOS transistor SW1 remains in the ON state, therefore there is almost no current flowing in the forward direction in the parasitic diode of the NMOS transistor SW1. Accordingly, the commutation loss is very small.

Note that the drive circuit 12 driving the NMOS transistor SW2 operates in the same way. FIGS. 8A to 8G are timing charts showing the overall operation of the synchronous rectification circuit 10, in which FIG. 8A shows the output voltage Vs of the transformer Tm, FIG. 8B shows the output voltage (trigger signal) Vt1 of the transformer T1, FIG. 8C shows the drain-source voltage Vds of the NMOS transistor SW1, FIG. 8D shows the gate-source voltage Vgs of the NMOS transistor SW1, FIG. 8E shows the output voltage (trigger signal) Vt2 of the transformer T2, FIG. 8F shows the drain-source voltage Vds of the NMOS transistor SW2, and FIG. 8G shows the gate-source voltage Vgs of the NMOS transistor SW2.

As shown in FIGS. 8B and 8E, the trigger signals are alternately output from the transformers T1 and T2 in accordance with the output voltage of the transformer Tm.

Immediately after the trigger signals are output (after the advance time of trigger signals), the corresponding rectification switch elements are turned off. Namely, as a whole, the NMOS transistors SW1 and SW2 repeatedly turn ON and OFF at timings shifted in phase by 180 degrees in accordance with the output level of the transformer Tm.

As explained above, according to the switching power supply device 1, the NMOS transistor SW1 is driven with respect to the output of the transformer Tm based on for example the signal obtained by combining the trigger signal Vt1 advanced in the rising timing and the drain voltage of the NMOS transistor SW1. At that time, the energy of the coil L1 is controlled to be charged and discharged to and from the gate of the NMOS transistor SW1 to drive it, therefore the time of turning on the parasitic diode of the NMOS transistor SW1 is very short. Further, no penetration current is generated in the NMOS transistors SW1 and SW2. The NMOS transistor SW1 is always ON even at the time of commutation. Therefore, the efficiency of the synchronous rectification is extremely high.

According to the switching power supply device 1, the gate voltage of the NMOS transistor SW1 is not clamped at a constant value with respect to the input voltage, but is clamped adaptively without loss in accordance with the output voltage of the transformer Tm by the operation of the coil L1. Accordingly, the loss due to clamping the drive voltage to the high input voltage becomes almost zero and the efficiency is further improved.

According to the switching power supply device 1, the voltage of the capacitor C1 is stabilized (FIG. 7I) even with respect to a low input voltage, therefore fluctuation of the input voltage does not cause the drive voltage level to become insufficient, and a high rectification efficiency can be realized for the NMOS transistor SW1 in a broad range of input voltage.

According to the switching power supply device 1, when the NMOS transistors Q3 and Q4 are turned on, the current of the coil L1 rises from 0, therefore the loss when turning on the NMOS transistors Q3 and Q4 becomes 0. On the other hand, when the NMOS transistors Q3 and Q4 are turned off, the current flowing in the coil L1 becomes the maximum, therefore a speed of driving the transistors Q1 and Q2 becomes the maximum, and it becomes possible to quickly drive the NMOS transistor SW1. Accordingly, this is particularly preferred for the purpose of switching the NMOS transistor SW1 at a high speed.

According to the switching power supply device 1, the voltage of the capacitor C1 can be freely set in accordance with the value of the inductance of the coil L1. Namely, the energy shown in the above Equation (4) is completely consumed by the transistors Q1 and Q2 in order to charge/discharge the gate of the NMOS transistor SW1. Further, this gate-source voltage Vgs is clamped to the voltage Vc1 of the capacitor C1, whereby the voltage of the capacitor C1 is set. Accordingly, by optimizing the voltage of the capacitor C1, it becomes possible to configure a more efficient drive circuit.

Next, as an embodiment of the synchronous rectification circuit according to the present invention, a synchronous rectification circuit 10a obtained by adding to the synchronous rectification circuit 10 of the switching power supply device 1 explained above a protection circuit for detecting an abnormality (output abnormality) in the secondary side output of the transformer Tm and the output of the trigger signal and protecting the NMOS transistors SW1 and SW2 will be explained. Below, a synchronous rectification circuit 10a where a protection circuit (protection circuit 13) is added to the drive circuit 11 driving the NMOS transistor SW1, one switch element, will be explained, but a similar protection circuit is added to the drive circuit 12.

When detecting an abnormality of the output of the transformer Tm, this protection circuit 13 does not forcibly (instantaneously) turn off the NMOS transistor SW1, but takes time to turn off the NMOS transistor SW1 while maintaining the drain-source voltage of the NMOS transistor SW1 at a constant value in a linear drive operation. Due to this, the energy stored in the coil L3 is gradually released, and the NMOS transistor SW1 is protected from breakage due to the high voltage of the drain-source voltage.

Figure 9:
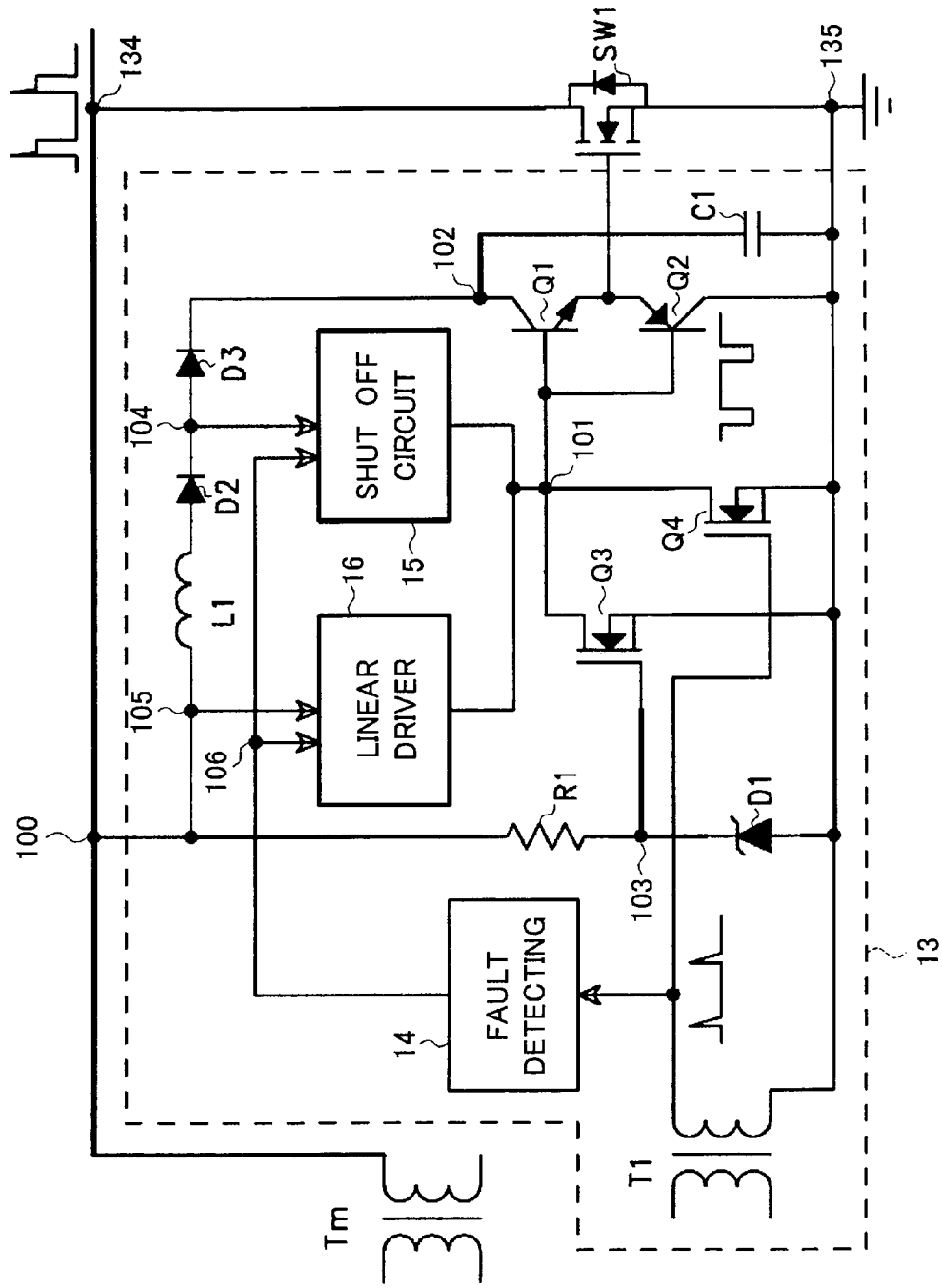
FIG. 9 is a block diagram of a synchronous rectification circuit according to an embodiment of the present invention.

FIG. 9 is a block diagram of a drive circuit 13 obtained by adding a protection circuit to the drive circuit 11 of the reference device explained above (FIG. 4). As illustrated, in the drive circuit 13, three circuit blocks of a fault detecting circuit 14, a shutoff circuit 15, and a linear driver 16 are added to the drive circuit 11.

The fault detecting circuit 14 detects an abnormality of the trigger signal transmitted from the transformer T1. When the PWM control circuit 20 is broken, an output abnormality occurs in both of the transformers T1 and Tm, therefore, by monitoring the trigger signal, an output abnormality of the transformer Tm (for example a semi-wave of the PWM waveform is not output) can be detected. When the fault detecting circuit 14 detects an abnormality, the shutoff circuit 15 quickly cuts off the gate drive signal source of the NMOS transistor SW1 forming a rectification switch element. The linear driver 16 is a circuit holding (clamping) the drain-source voltage of the NMOS transistor SW1 forming a rectification switch element at a constant value and not immediately turning off the NMOS transistor SW1 when an abnormality is detected by the fault detecting circuit 14. Due to this, the energy stored in the coil L3 is gradually released, and the NMOS transistor SW1 is protected.

Figure 10:
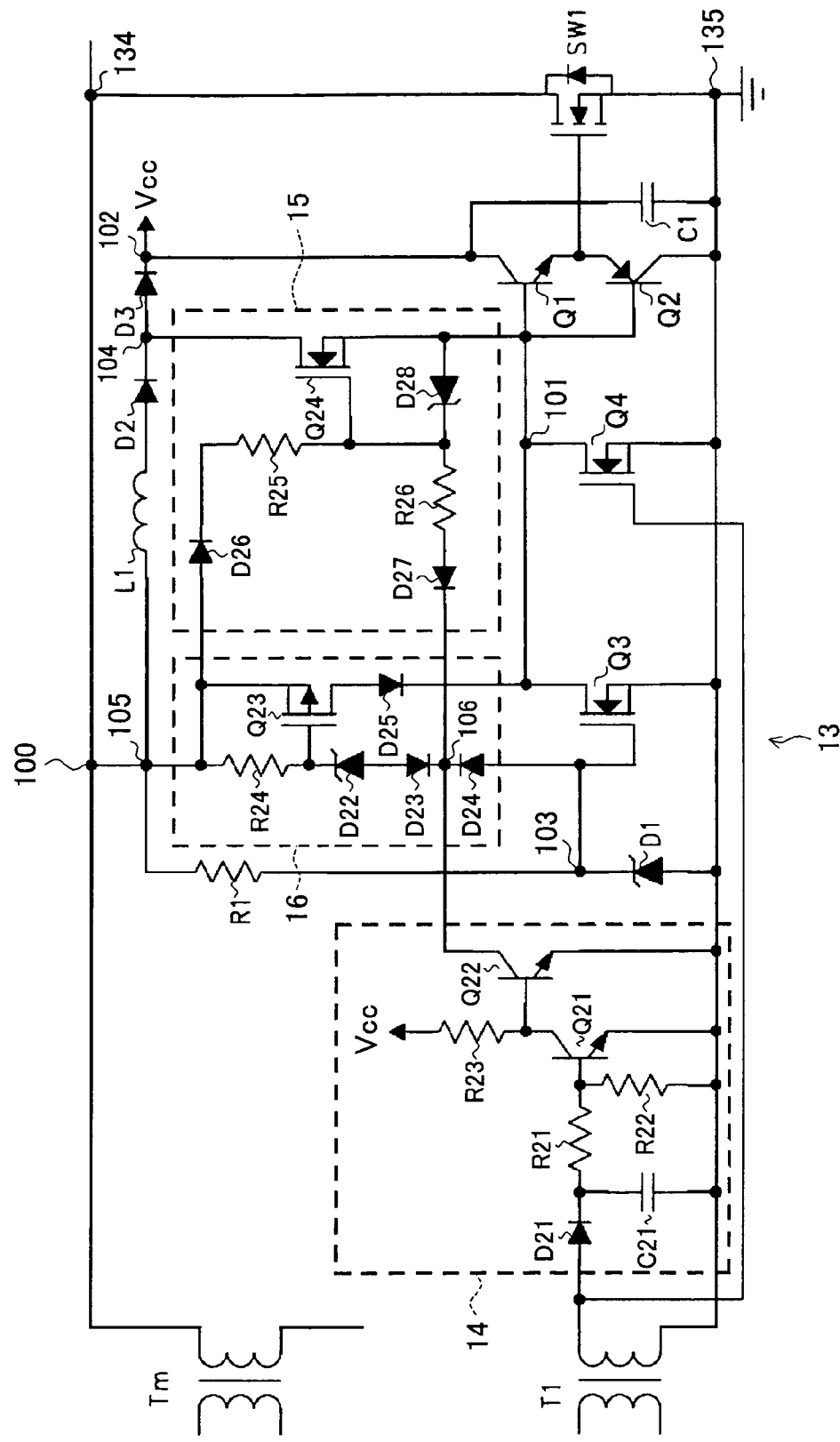
FIG. 10 is a circuit diagram of a synchronous rectification circuit according to an embodiment of the present invention.

FIG. 10 is a circuit diagram of the drive circuit 13 of the synchronous rectification circuit according to an embodiment including specific examples of the fault detecting circuit 14, the shutoff circuit 15, and the linear driver 16. Below, the circuit configurations of the fault detecting circuit 14, the shutoff circuit 15, and the linear driver 16 will be explained with reference to FIG. 10.

Fault Detecting Circuit 14

The fault detecting circuit 14 is connected to the secondary winding of the transformer T1 and controls the ON and OFF states of the transistor Q22 in accordance with an amplitude level of the trigger signal generated by the transformer T1. Namely, it detects an abnormality of the trigger signal by the fact that when the amplitude level of the trigger signal is larger than the predetermined threshold value, the transistor Q22 turns off, while when the amplitude level is smaller than the threshold value, the transistor Q22 turns on. In the fault detecting circuit 14, the voltage charged in the capacitor C21 is divided by the resistors R21 and R22. This divided voltage becomes the base-emitter voltage of the transistor Q21. Accordingly, when the trigger signal is normal, by the transistor Q21 turning on, the base potential of the transistor Q22 becomes the low potential (the level voltage dropped from Vcc by the resistor R23) and the transistor Q22 turns off. On the other hand, when the trigger signal is abnormal, by the transistor Q21 turning off, the base potential of the transistor Q22 becomes the high potential (Vcc level) and the transistor Q22 turns on.

Figure 11:
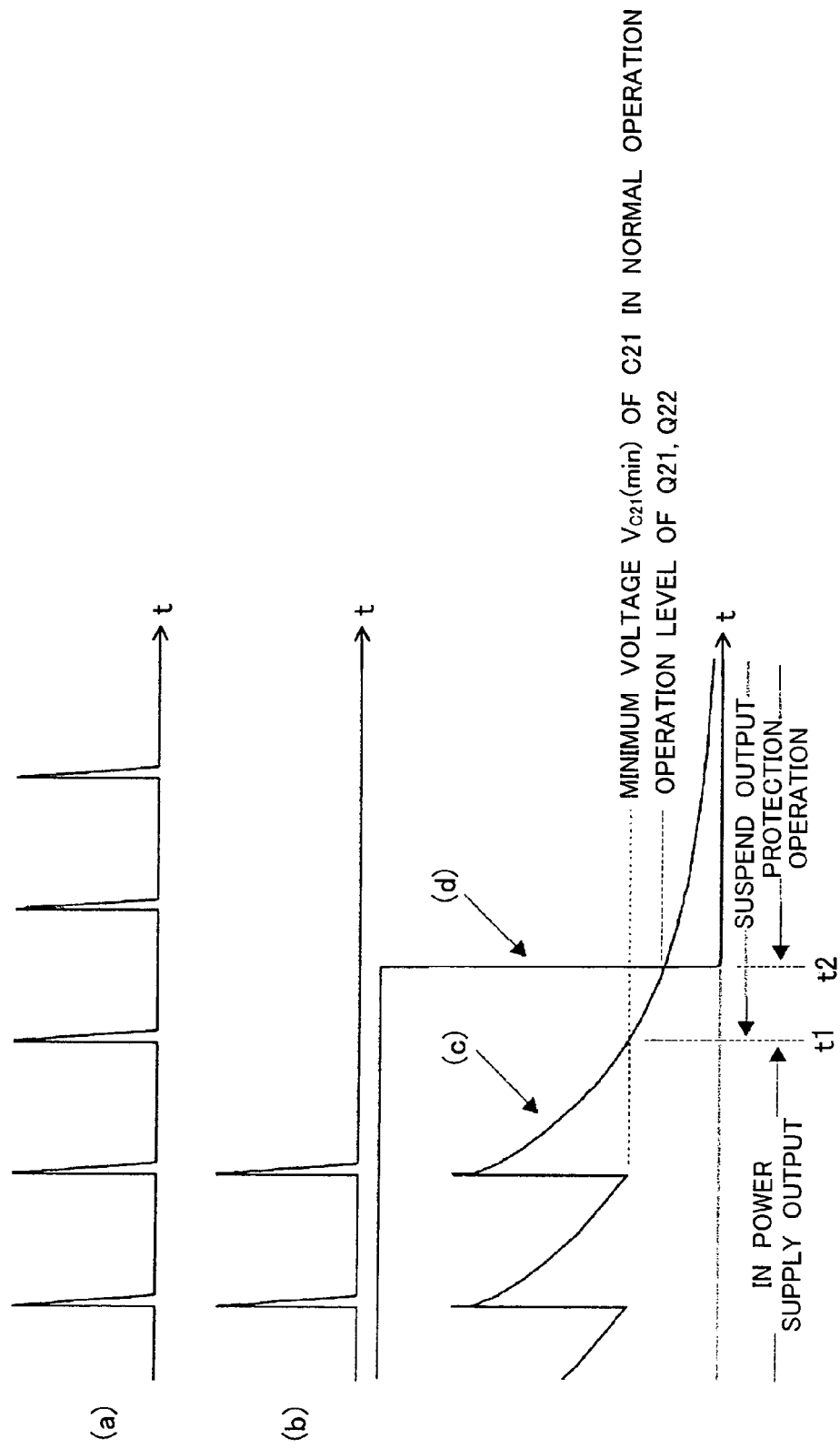
FIG. 11 is a timing chart showing an output abnormality detection operation.

FIG. 11 is a timing chart showing the detection operation of the fault detecting circuit 14. In FIG. 11, (a) shows a normal trigger signal waveform, (b) shows an abnormal trigger signal waveform, (c) shows a voltage waveform of a capacitor C21 when the output is abnormal, and (d) shows a collector-emitter voltage $V_{CE}$ of the transistor Q22.

As shown in (b) of FIG. 11, when the trigger signal is no longer generated at the time t1 due to trouble in for example the PWM control circuit 20, the charge voltage of the capacitor C21 is further lowered from the minimum voltage $V_{C21}$ (min) in the normal state. When the charge voltage of the capacitor C21 becomes the level operating the transistors Q21 and Q22 (time t2), the base voltage VBE obtained by dividing the charge voltage becomes the threshold voltage or less, the transistor Q21 turns off, and the transistor Q22 turns on. Due to this, at the time t2, the collector and the emitter of the transistor Q22 become conductive, and $V_{CE}$ becomes equal to 0. After this time t2, a protective operation is carried out by the operation of the shutoff circuit 15.

Shutoff Circuit 15

When the fault detecting circuit 14 detects an output abnormality, the shutoff circuit 15 cuts off the flow of the discharge current of the inductor L1 via the transistor Q1 into the gate of the NMOS transistor SW1. Accordingly, the shutoff circuit 15 operates after the fault detecting circuit 14 detects an output abnormality. Namely, when no output abnormality is detected (normal), the transistor Q22 turns off, a cathode of the diode D27 connected to the collector of the transistor Q22 is opened, and the shutoff circuit 15 does not operate.

Below, the configuration of the shutoff circuit 15 will be explained with reference to FIG. 10. The NMOS transistor Q24 is connected at its drain to the node 104 and connected at its source to the base of the transistor Q1. By this, the connection between one end of the inductor L1 and the base of the transistor Q1 is controlled in accordance with the gate-source voltage of the NMOS transistor Q24.

The diode D26 and the resistor R25 are connected in series between the node 100 (or node 105) and the gate of the NMOS transistor Q24. Due to this, when the output of the transformer Tm is normal and a positive output voltage V is induced at the node 100, the NMOS transistor Q24 is charged at its gate via this diode D26 and the resistor R25 and turns on. Then, the node 104 and bases of the transistors Q1 and Q2 are connected and a circuit configuration electrically equivalent to the above synchronous rectification circuit 10 (see FIG. 6) is exhibited. Note that once the NMOS transistor Q24 turns on, the gate voltage is clamped to a constant voltage by a Zener diode D28 connected between the gate and source of the NMOS transistor Q24 and charging or discharging via the diode D26 is not possible, therefore the NMOS transistor Q24 remains ON.

The diode D27 and the resistor R26 are connected in series between the gate of the NMOS transistor Q24 and the collector of the transistor Q22 of the fault detecting circuit 14. When normal, the transistor Q22 turns off and is in the opened state, therefore the diode D27 and the resistor R26 do not operate.

The operation when the fault detecting circuit 14 detects an output abnormality becomes as follows. First, an output abnormality is detected at the fault detecting circuit 14, and the transistor Q22 turns on. Then, the gate charge of the NMOS transistor Q3 is discharged to the ground via the diode D24 and the collector and emitter of the transistor Q22, and the gate charge of the NMOS transistor Q24 is discharged to the ground via the resistor R26, the diode D27, and the collector and emitter of the transistor Q22. The NMOS transistor Q24 turns off since its gate voltage is lowered, the Zener diode D28 turns on in the forward direction, and the base currents of the transistors Q1 and Q2 are lowered. In this way, when an output abnormality is detected, the shutoff circuit 15 cuts off the current via the inductor L1 and prevents the NMOS transistor SW1 from turning on by this current route.

Note that the speed of the fall of the base currents of the transistors Q1 and Q2 can be adjusted by the resistor R26. Namely, the resistor R26 can adjust the speed of the NMOS transistor SW1 turning off.

Linear Driver 16

When the fault detecting circuit 14 detects an abnormality as explained before, the linear driver 16 prevents the NMOS transistor SW1 from turning off soon while holding (clamping) the drain-source voltage of the NMOS transistor SW1 at a constant value. Below, the configuration of the linear driver 16 will be explained with reference to FIG. 10.

The PMOS transistor Q23 connects the node 100 and the node 101 by turning on in together with the transistor Q22 when the fault detecting circuit 14 detects an output abnormality, that is, when the transistor Q22 turns on. The source of the PMOS transistor Q23 is connected to the node 100, and its drain is connected via the diode D25 to the node 101. A resistor R24 is connected between the gate and source of the PMOS transistor Q23. Between the gate of the PMOS transistor Q23 and a node 106, a Zener diode D22 and a diode D23 are connected in series. At that time, as shown in FIG. 10, the cathode of the Zener diode D22 is located on the gate side of the transistor Q23, and the cathode of the diode D23 is located on the node 106 side.

The diode D24 is connected between the gate of the NMOS transistor Q3 and the node 106. As explained before, at the time of detection of an output abnormality by the fault detecting circuit 14, the gate charge of the NMOS transistor Q3 is discharged.

When no output abnormality is detected (at the time of normal output), the transistor Q22 of the fault detecting circuit 14 turns off, and the node 106 is opened. Accordingly, the gate-source voltage Vgs of the PMOS transistor Q23 becomes equal to 0, and the PMOS transistor Q23 turns off in cooperation with the transistor Q22. Namely, at the time of normal output, the linear driver 16 exerts no influence upon the overall operation of the drive circuit 13.

When an output abnormality is detected, for example when the output of the transformer T1 becomes 0, the linear driver 16 clamps the drain-source voltage Vds of the NMOS transistor SW1 at a constant voltage so that the drain-source voltage Vds of the NMOS transistor SW1 does not become a level exceeding the withstand voltage due to the release of the energy stored in the output inductor L3 or L4 (see FIG. 3) of the switching power supply device, then turns on the NMOS transistor SW1 for a while in accordance with the amount of energy release in order to secure an energy release loop.

Specifically, the operation of the linear driver 16 when an output abnormality is detected becomes as follows. When an output abnormality is detected, the transistor Q22 of the fault detecting circuit 14 turns on, and the PMOS transistor Q23 turns on in cooperation with that. The charge released from the output inductor charges the gate of the PMOS transistor Q23 via the resistor R24 and quickly turn the transistor on. Then, as indicated by an arrow A in FIG. 12, a portion of the charge released from the output inductor flows into the transistors Q1 and Q2 via the source and drain of the PMOS transistor Q23 and the diode D25.

As a result, the base current of the transistor Q1 is not lowered so much irrespective of the current route via the diode D27 and the resistor R26. Accordingly, the gate charge of the NMOS transistor SW1 is not discharged soon.

Figure 12:
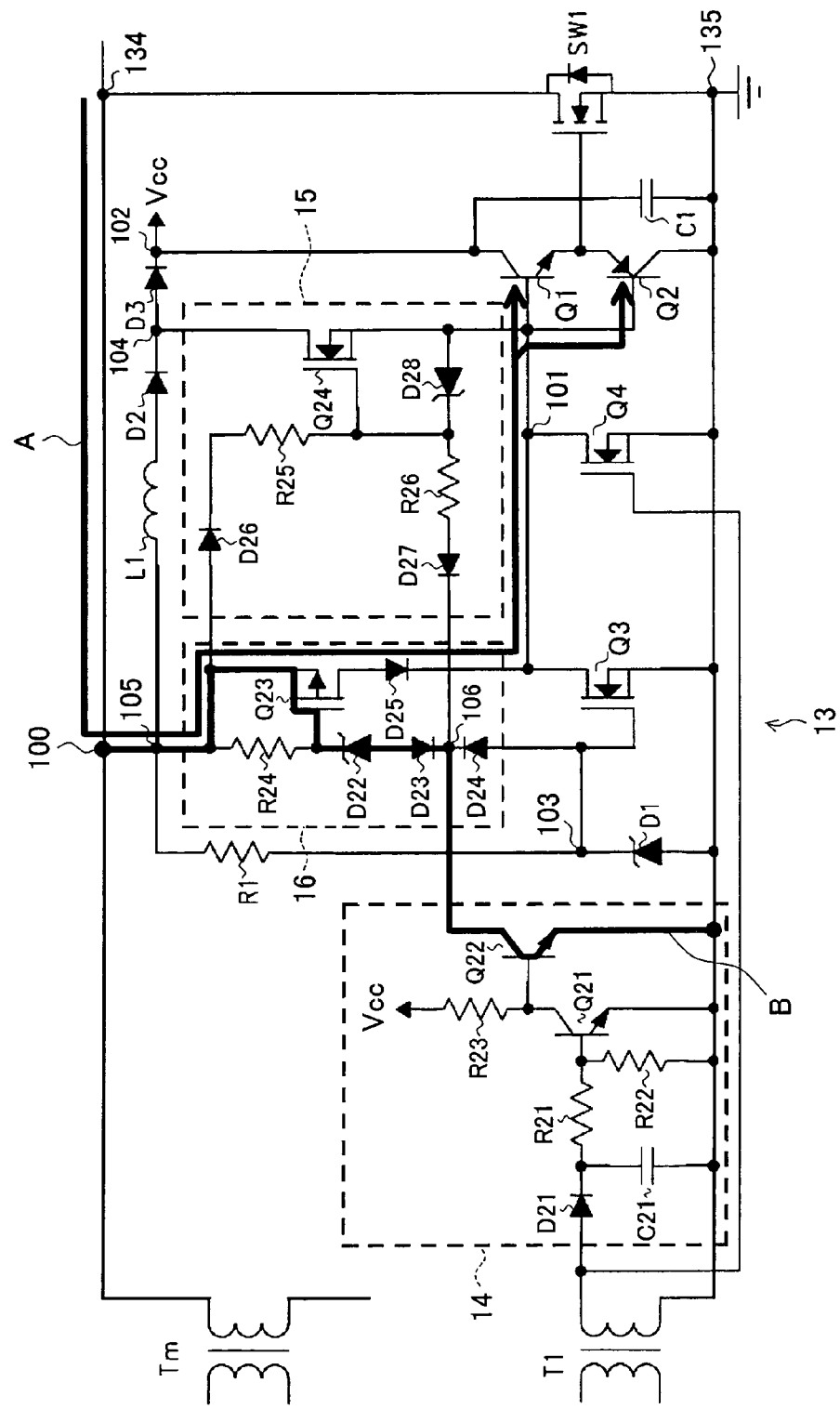
FIG. 12 is a diagram for explaining a linear drive operation.

At this time, as indicated by the bold line B of FIG. 12, the drain-source voltage Vds of the NMOS transistor SW1 becomes as in the following Equation (5):

$$Vds=Vgsoff(Q23)+V_Z(D22)+V_F(D23)+Vces(Q22) \quad (5)$$

Here, Vgsoff (Q23): gate/source shutoff voltage of Q23;
Vz(Q22): breakdown voltage of D22;
VF(D23): forward direction voltage of D23; and
Vces(Q22): collector-emitter saturation voltage of Q22.

Namely, when the linear driver 16 is operating, the drain-source voltage Vds of the NMOS transistor SW1 is clamped to the constant voltage determined according to above Equation (5) (linear drive). This drain-source voltage Vds until the energy stored in the output inductor L3 or L4 is released or consumed is maintained. When all of the energy is released or consumed, the NMOS transistor SW1 turns off. Note that, as shown in the above Equation (5), by adjusting the breakdown voltage rank of the diode D22, it is possible to suitably set the drain-source voltage Vds in accordance with the application.

As explained above, according to the synchronous rectification circuit according to the present embodiment, when the fault detecting circuit 14 detects an output abnormality, the shutoff circuit 15 quickly cuts off the gate drive signal of the NMOS transistor SW1. Then, the linear driver 16 protects the NMOS transistor SW1 by holding (clamping) the drain-source voltage of the NMOS transistor SW1 at a constant value and, at the same time, does not turn off the NMOS transistor SW1 soon (forcibly), but holds the on state for a while and gradually releases the energy of the output inductor during that time. Due to this, the synchronous rectification circuit is suitably protected at the time of the abnormal output.

In the synchronous rectification circuit according to the present embodiment, when no output abnormality is detected (when normal), the linear driver 16 becomes the opened state (transistor Q22 is OFF) and does not operate, and in the shutoff circuit 15, the NMOS transistor Q24 is continuously ON, therefore these circuits exert no influence upon the efficiency of the overall synchronous rectification circuit. Further, when normal, the power consumption of the fault detecting circuit 14 is small, so exerts almost no influence upon the efficiency of the over synchronous rectification circuit.

It should be understood by those skilled in the art that various modifications, combinations, sub-combinations and alterations may occur depending on design requirements and other factors in so far as they are within the scope of the appended claims or the equivalents thereof.

For example, the present invention can be applied to synchronous rectification circuits in various types of switching power supply devices such as the forward type, flyback type, half bridge type, and full bridge type.

Figure 13:
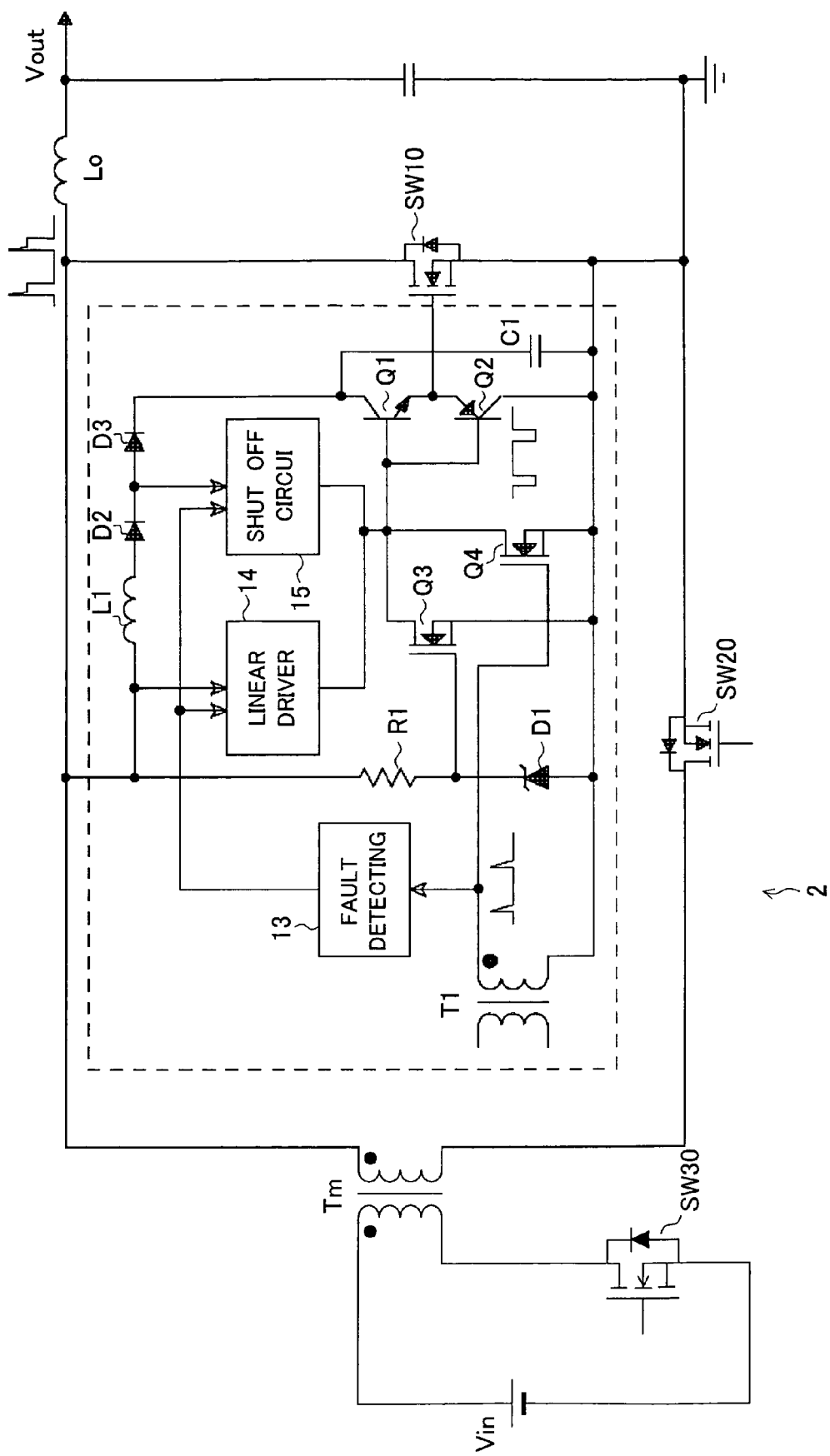
FIG. 13 is a circuit diagram of a forward type synchronous rectification circuit provided with a protection circuit.

FIG. 13 is a diagram showing the circuit configuration of a forward type switching power supply device 2 provided with the protection circuit explained in the above embodiment. In FIG. 13, an NMOS transistor SW10 operates as the commutation use switch element, and an NMOS transistor SW20 operates as the rectification switch element.

Finally, the correspondence between the elements of the claims and the parts of the embodiment will be described. The transformer Tm corresponds to the main transformer of the claims. The transformer T1 corresponds to the auxiliary transformer of the claims. The nodes 100, 101, and 106 correspond to the first, second, and third nodes of the claims. The NMOS transistor SW1 corresponds to the first N channel transistor of the claims. The coil L1 corresponds to the inductor of the claims. The transistors Q1, Q2, and Q22 correspond to the first, second, and fifth transistors of the claims. The NMOS transistors Q3, Q4, and Q24 correspond to the third, fourth, and sixth transistors of the claims. The PMOS transistor Q23 corresponds to the seventh transistor of the claims. The diodes D24 and D22 correspond to the first and second diodes of the claims. The resistor R26 corresponds to the first resistor of the claims.

We claim:

1. A synchronous rectification circuit comprising:

a main transformer for transmitting a first voltage in accordance with a duty ratio of a PWM signal;

a first N channel transistor having a drain connected to a first node formed by one end of a secondary winding of said main transformer, having a source connected to a reference potential terminal, and rectifying a current generated in the secondary winding;

an auxiliary transformer for outputting a trigger signal having a phase advanced by a level change of said first voltage;

an inductor connected between said first node and a second node;

a first transistor for controlling a conduction state between said second node and a gate of said first N channel transistor in accordance with the potential of said second node and charging the gate of the first N channel transistor by a discharge of said inductor when the first N channel transistor turns on;

a second transistor for controlling the conduction state between the gate of said first N channel transistor and the reference potential terminal in accordance with the potential of said second node and serving the gate potential of said first N channel transistor as the reference potential when the first N channel transistor turns on;

a third transistor for controlling the conduction state between said second node and the reference potential terminal in accordance with the potential of said first node;

a fourth transistor for controlling the conduction state between said second node and the reference potential terminal in accordance with said trigger signal;

a detection circuit including a fifth transistor turning off when a level of said trigger signal not less than a first threshold value and turning on when the level is lower than the first threshold value and detecting an abnormality of a trigger signal;

a shutoff circuit including a sixth transistor for controlling the conduction between said inductor and said first transistor, turning on when said fifth transistor turns off, and turning off when said fifth transistor turns on, cutting off a discharge route of said inductor responsive to detection of an abnormality of said trigger signal; and a drive circuit including a seventh transistor connected between said first node and said second node and turning on or off in cooperation with the fifth transistor, holding said first N channel transistor in its drain-source voltage at a constant voltage and, at the same time, turning on said first transistor by that constant voltage when the seventh transistor turns on.

2. A synchronous rectification circuit as set forth in claim 1, wherein said fifth transistor is connected between the third node and the reference potential terminal, and said drive circuit further has
a first diode connected between said third node and said third transistor and turning off the third transistor when said fifth transistor turns on and
a second diode connected between said third node and the gate of said seventh transistor and generating a constant voltage when said fifth transistor turns on.

3. A synchronous rectification circuit as set forth in claim 1, wherein said shutoff circuit is provided between the base of said first transistor and said third node with a first resistor for adjusting a base current of the first transistor when said fifth transistor turns on.

4. A synchronous rectification circuit as set forth in claim 2, wherein said shutoff circuit is provided between the base of said first transistor and said third node with a first resistor for adjusting a base current of the first transistor when said fifth transistor turns on.

* * * * *